(12) United States Patent
Collins et al.

(10) Patent No.: US 11,849,025 B2
(45) Date of Patent: *Dec. 19, 2023

(54) METHOD AND SYSTEM FOR OPTIMIZATION OF BLOCKCHAIN DATA STORAGE

(71) Applicant: Mastercard International Incorporated, Purchase, NY (US)

(72) Inventors: Robert Collins, Dublin (IE); Rob Byrne, Wicklow (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,630

(22) Filed: Aug. 12, 2022

(65) Prior Publication Data

US 2022/0385452 A1    Dec. 1, 2022

Related U.S. Application Data (63) Continuation of application No. 16/720,192, filed on Dec. 19, 2019, now Pat. No. 11,438,143.

(51) Int. Cl.
*H04L 9/06* (2006.01)
*G06F 3/06* (2006.01)
*H04L 9/00* (2022.01)

(52) U.S. Cl.
CPC .......... *H04L 9/0643* (2013.01); *G06F 3/0608* (2013.01); *H04L 9/50* (2022.05); *H04L 2209/56* (2013.01)

(58) Field of Classification Search
CPC .. G06F 16/219; G06F 16/2365; G06F 16/137; G06F 3/0608; G06F 16/184; G06F 3/0652; H04L 63/12
See application file for complete search history.

(56) References Cited

U.S. PATENT DOCUMENTS

2020/0125269 A1* 4/2020 Karame .............. G06F 16/1824
2021/0097059 A1* 4/2021 Huang .................. G06F 16/219

* cited by examiner

*Primary Examiner* — Olugbenga O Idowu
(74) *Attorney, Agent, or Firm* — Panitch Schwarze Belisario & Nadel LLP (57) ABSTRACT

A method for reducing file size of a blockchain through hash truncation includes: receiving a plurality of blockchain transactions; generating a first Merkle root of a first Merkle tree comprised of a first hash of each of the plurality of blockchain transactions; generating a second Merkle root of a second Merkle tree comprised of a second hash of each of the plurality of blockchain transactions, where the second hash is a truncation of the first hash for the respective blockchain transaction; generating a new block comprised of a block header and the first hash of each of the plurality of blockchain transactions, the block header including at least a timestamp, the first Merkle root, the second Merkle root, and a block reference value associated with a prior block in a blockchain; and transmitting the generated new block to a plurality of additional nodes in the blockchain network.

20 Claims, 6 Drawing Sheets

METHOD AND SYSTEM FOR OPTIMIZATION OF BLOCKCHAIN DATA STORAGE

FIELD

The present disclosure relates to reducing the data size of a blockchain through the use of hash truncation, specifically the truncation of hash values stored in a blockchain to reduce the overall data size of a blockchain over time, while utilizing multiple reference values to retain immutability.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also allowing for anonymity as to the individuals or entities involved in a transaction. Blockchains often rely on miners that participate in confirming transactions, where confirmation of transactions involves reviewing the entire chain to identify the unspent outputs being used in a transaction and ensuring that the currency is still available for transfer by the spender. While this can be a relatively simple operation, the operation becomes more time consuming and laborious for miners as the size of the blockchain increases.

Blockchains are designed to be permanent and immutable records, where the entire chain continues without archiving or other data reduction techniques. As such, the longer a blockchain operates, the longer the chain gets, which results in increasing data sizes for the blockchain. For chains that are designed to operate over a period of years, and with chains that will involve millions of entries, the data size can become prohibitively large. Such sizes can result in slower operation of computing systems, difficulty in transmission due to limited bandwidth, slower operation of blockchain functions, etc. Thus, there is a need for a technical system that can reduce the data size of a blockchain without necessarily sacrificing the immutability of the chain.

SUMMARY

The present disclosure provides a description of systems and methods for reducing file size of a blockchain through hash truncation. In a blockchain where the data values are stored as hashes, transactions or other data are represented by a hash value that has a predetermined size, such as 512 bits. In a traditional blockchain, the header for a block will have a root of a Merkle tree for all of the data values stored in that block. In the present disclosure, the header will include a series of Merkle roots, where each is based on a different hash size for the data values in the block. A Merkle root will be identified for the full hash values of each block (e.g., 512 bits), as well as a Merkle root for a truncated version of each hash value (e.g., the first 256 bits of each 512-bit hash) and can include Merkle roots for further truncations (e.g., for 128-bit truncated hashes and 64-bit truncated hashes). When a reduction in file size is desired, the hash values stored in a block can be truncated down and the excess discarded, cutting the size of each block nearly in half, for example. By having Merkle roots for the truncated versions already identified and stored in the chain, the immutability of the chain can be maintained, while still having the data size of the blockchain reduced. The result is an improvement over standard blockchains that enables a data size that can be reduced multiple times without having to perform any new calculations or verifications for the blockchain.

A method for reducing file size of a blockchain through hash truncation includes: receiving, by a receiver of a blockchain node in a blockchain network managing a blockchain, a plurality of blockchain transactions; generating, by a processor of the blockchain node, a first Merkle root of a first Merkle tree comprised of a first hash of each of the plurality of blockchain transactions; generating, by the processor of the blockchain node, a second Merkle root of a second Merkle tree comprised of a second hash of each of the plurality of blockchain transactions, where the second hash is a truncation of the first hash for the respective blockchain transaction; generating, by the processor of the blockchain node, a new block comprised of a block header and the first hash of each of the plurality of blockchain transactions, the block header including at least a timestamp, the first Merkle root, the second Merkle root, and a block reference value associated with a prior block in the blockchain; and transmitting, by a transmitter of the blockchain node, the generated new block to a plurality of additional nodes in the blockchain network.

A system for reducing file size of a blockchain through hash truncation includes: a blockchain network managing a blockchain; a plurality of additional nodes included in the blockchain network; and a blockchain node in the blockchain network, the blockchain node including a receiver receiving a plurality of blockchain transactions, a processor generating a first Merkle root of a first Merkle tree comprised of a first hash of each of the plurality of blockchain transactions, generating a second Merkle root of a second Merkle tree comprised of a second hash of each of the plurality of blockchain transactions, where the second hash is a truncation of the first hash for the respective blockchain transaction, and generating a new block comprised of a block header and the first hash of each of the plurality of blockchain transactions, the block header including at least a timestamp, the first Merkle root, the second Merkle root, and a block reference value associated with a prior block in the blockchain, and a transmitter transmitting the generated new block to a plurality of additional nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or it may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for File Size Reduction of a Blockchain

Figure 1:
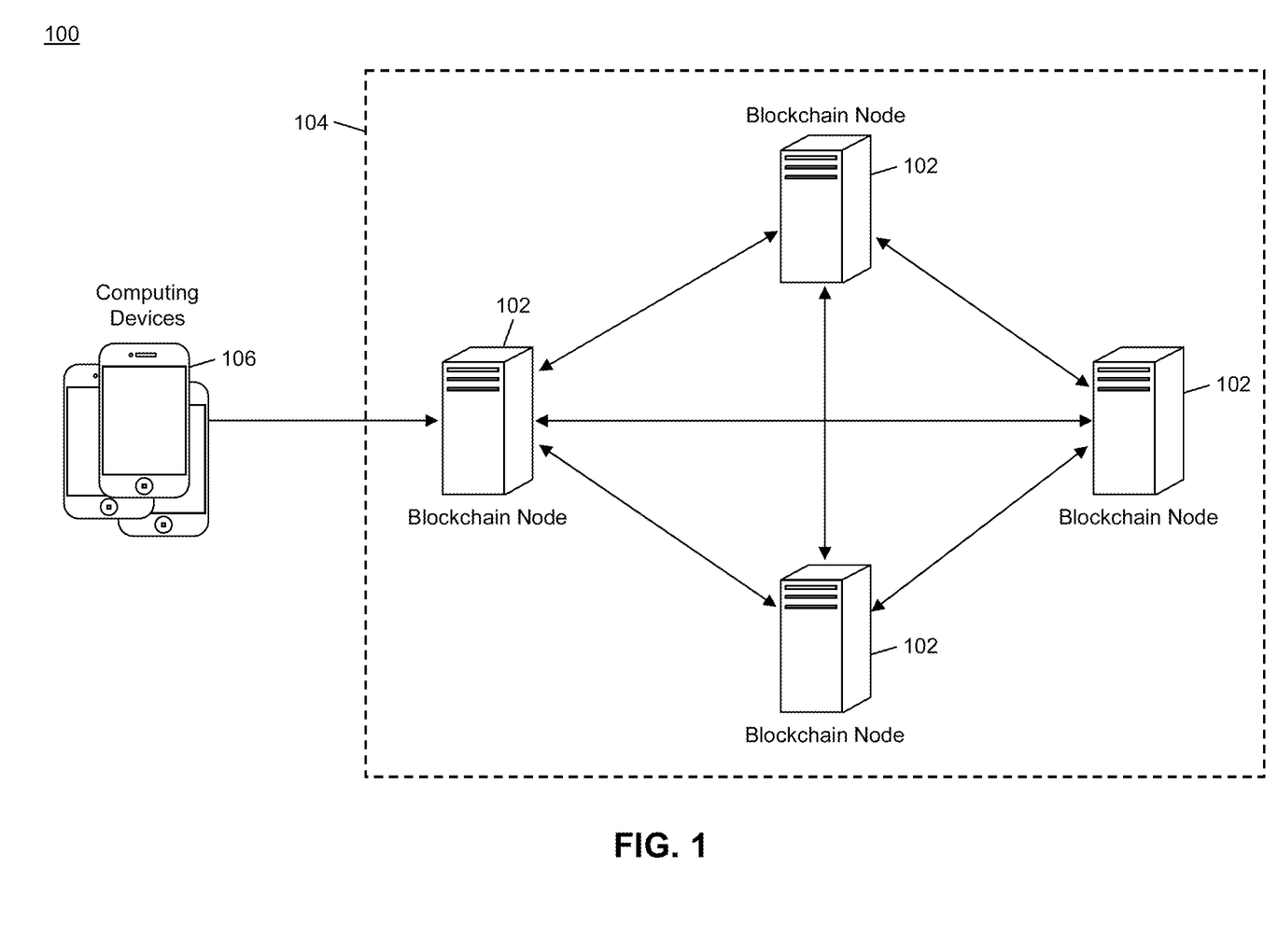
FIG. 1 is a block diagram illustrating a high-level system architecture for file size reduction of a blockchain through hash truncation in accordance with exemplary embodiments.

FIG. 1 illustrates a system 100 for reducing the file size of a blockchain through the truncation of hash values stored as blockchain data values therein, where multiple reference values are stored in a block header to maintain immutability.

Figure 2:
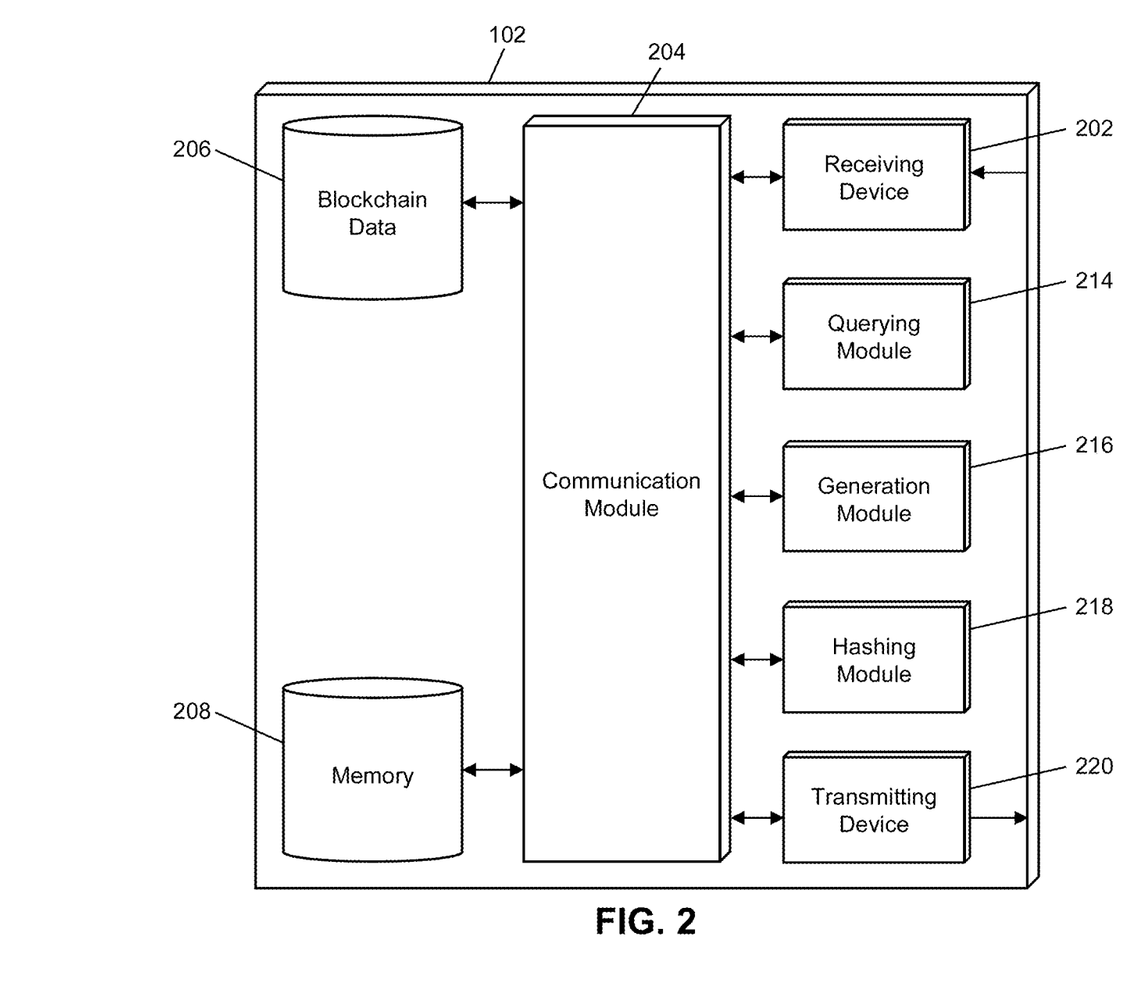
FIG. 2 is a block diagram illustrating a blockchain node of the system of FIG. 1 for reducing blockchain file size through hash truncation in accordance with exemplary embodiments.
Figure 6:
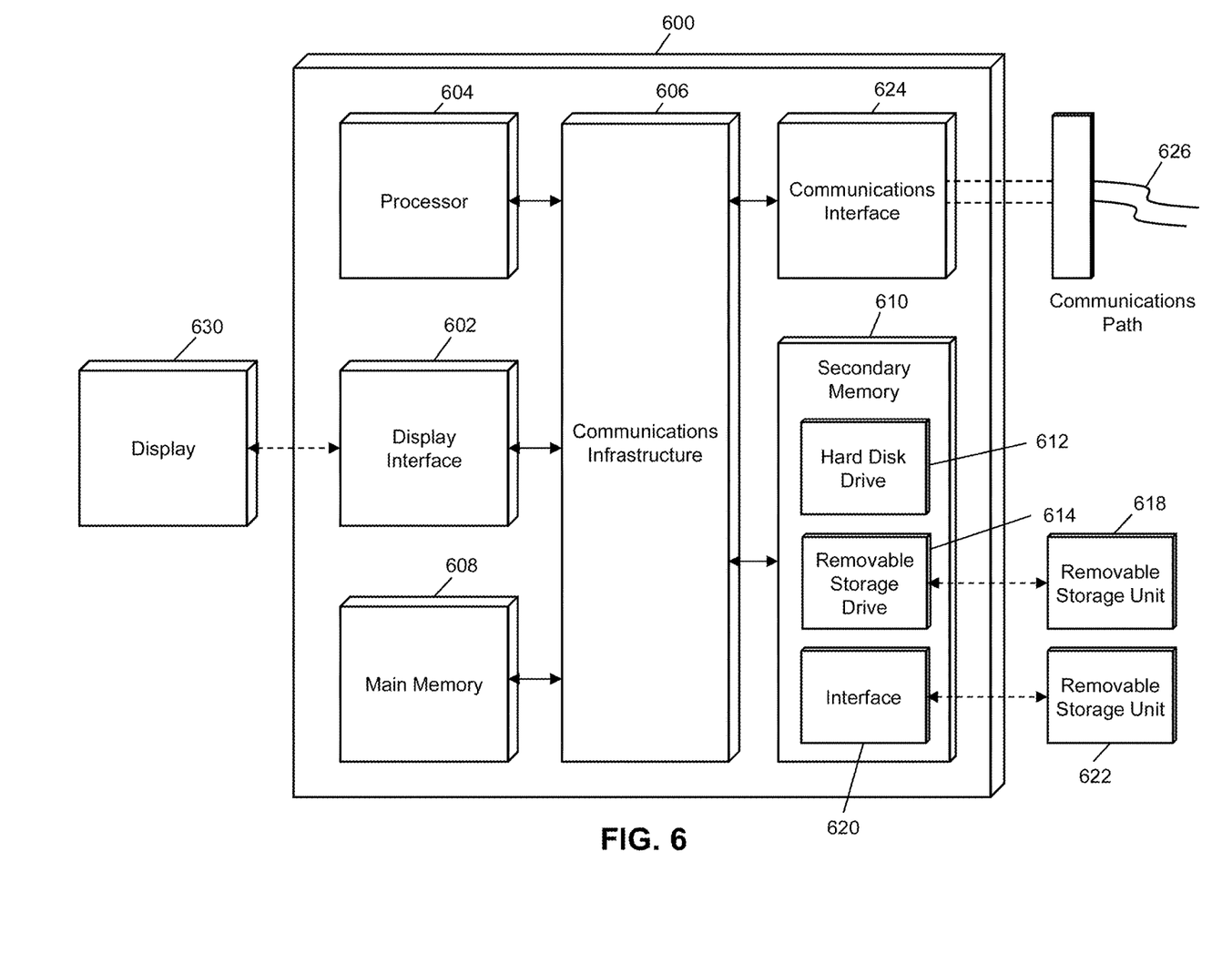
FIG. 6 is a block diagram illustrating a computer system architecture in accordance with exemplary embodiments.

The system 100 may include a blockchain network 104. The blockchain network 104 may be comprised of a plurality of blockchain nodes 102. Each blockchain node 102 may be a computing system, such as illustrated in FIG. 2 and FIG. 6, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In traditional blockchains, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., computing devices 106) that stores the private key for use thereof in blockchain transactions. For instance, each computing device may each have their own private key for respective cryptographic key pairs and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc. that has been specifically programmed to handle blockchain transactions.

In the system 100, blockchain data values may be hash values. The hash values may represent any suitable data, which may be dependent on the blockchain implementation, the needs of the system 100, etc. For instance, the blockchain may be used to store data regarding the transfer of currency, where each hash value may be the hash of a set of transaction data for the currency transfer. In another example, the blockchain may be used as an immutable record for contracts and other data that may benefit from auditing, where each hash value may be a hash of the contract or other data file. In yet another example, the blockchain may be used as a record of the chain of custody of consumer goods, where each hash value is a unique identifier for a specific consumer good or may be a hash value of data entry indicating location and identification of a specific consumer good.

In the system 100, a blockchain node 102 may receive blockchain transactions from computing devices 106. The computing devices 106 may submit the blockchain transactions to blockchain nodes 102 in the blockchain network 104 using any suitable communication network and method, such as via a web page, application programming interface, application program, etc. In some embodiments, the blockchain transactions submitted to the blockchain nodes 102 may be hash values. In other embodiments, the blockchain transactions submitted to the blockchain nodes 102 may be data entries, which may be hashed by the blockchain nodes 102 upon receipt. For instance, in an above example, a computing device 106 may submit a transaction record to a blockchain node 102, which may then apply a hashing algorithm to the transaction record to generate a hash value for the transaction record. In some cases, blockchain nodes 102 may receive a mixture of hash values and other data entries and may hash the received data entries as necessary.

Figure 3:
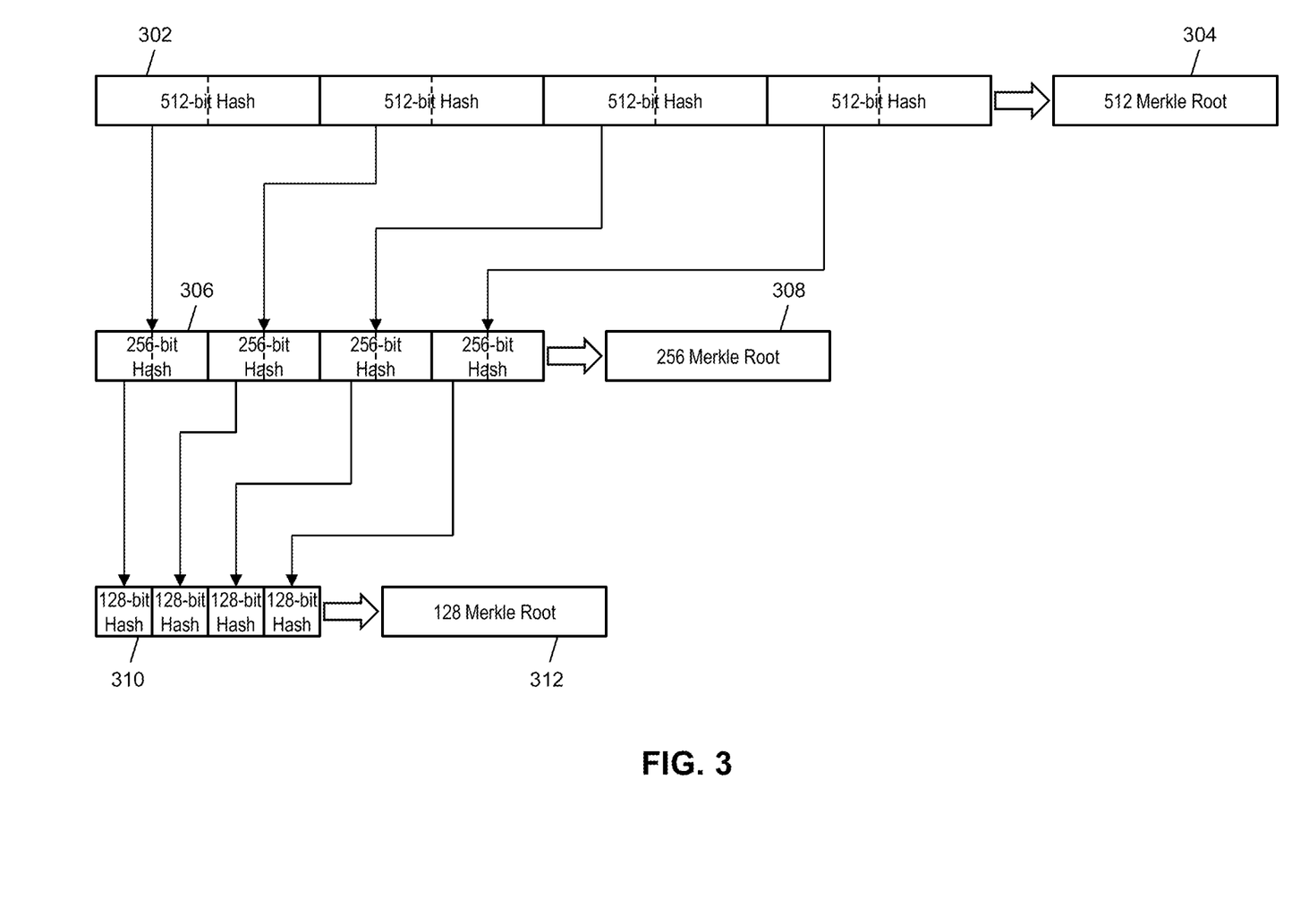
FIG. 3 is a diagram illustrating the identification of data reference values for truncated hashes for use in the system of FIG. 1 in accordance with exemplary embodiments.
Figure 4:
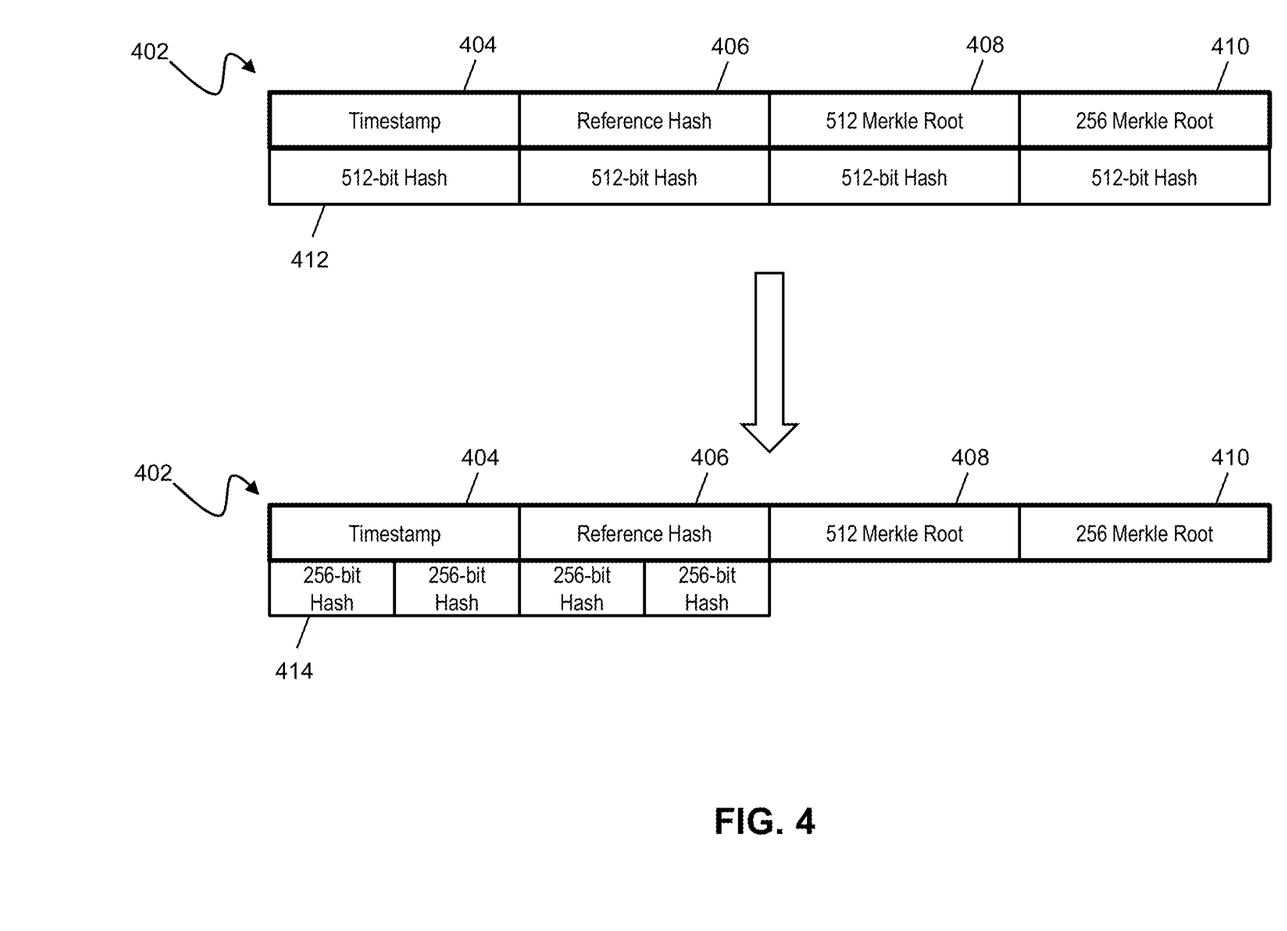
FIG. 4 is a diagram illustrating the file size reduction of a block in a blockchain as a result of hash truncation in the system of FIG. 1 in accordance with exemplary embodiments.

The blockchain nodes 102 may identify a first hash value for each blockchain transaction that is of a sufficient size for truncation using the methods and systems discussed herein. As illustrated in FIGS. 3 and 4 and discussed below, the first hash value may be a 512-bit hash value, such as generated for a blockchain transaction using the Secure Hash Algorithm 512. Other hashing algorithms and sizes for first hash values may be suitable for use in the methods and systems discussed herein.

Once a blockchain node 102 has the first hash for each blockchain transaction that is to be included in the next block, the blockchain node 102 may generate a first data reference value for the block. The data reference value may be the root of a Merkle tree generated using the first hashes for each transaction to be included in the block. In some cases, the block reference value may be the same size as the first hash value (e.g., 512 bits in the above example). In other cases, the block reference value may be a different size. In addition to the data reference value generated for the first hash value for each blockchain transaction, the blockchain node 102 may generate one or more additional data reference values based on potential truncation of the first hash values.

The blockchain node 102 may identify a truncated form of each of the first hash values, referred to herein as a second hash value. In an exemplary embodiment, the second hash value may be the first half of the first hash value. For instance, in the above example, the first 256 bits of a 512-bit hash value may be used as the second hash value. The blockchain node 102 may generate a second data reference value for the block, which may be the root of a Merkle tree of the second hash values for each blockchain transaction to be represented in the new block. The blockchain node 102 may repeat the process for additional truncations, such as a third hash value that is the first 128 bits of each 512-bit hash and corresponding Merkle root and for a fourth hash value that is the first 64 bits of each 512-bit hash and corresponding Merkle root. In some cases, each of the additional data reference values may be the same size as the first reference value (e.g., a 512-bit value). In other cases, each additional reference value may be the same size as the hash values to which it refers.

Once each of the data reference values have been identified, the blockchain node 102 may generate a new block for the blockchain. The new block may include a block header and the first hash values for each of the blockchain transactions to be stored therein. The block header may include a timestamp, a block reference value (e.g., a hash value of the header of the most recent block added to the blockchain, as discussed above), and each of the data reference values generated for the block. In some cases, a block header may also include additional information, such as versioning data, information regarding truncation (e.g., if truncation can vary from block to block, as discussed below), etc. The new block may then be distributed to other blockchain nodes 102 in the blockchain network 104 for confirmation and addition to the blockchain using traditional methods and systems. The blockchain may thus have the new block added thereto.

Over time, the blockchain nodes 102 may be interested in reducing the data size of the blockchain. In order to do so, blockchain nodes 102 may truncate the hash values stored in blocks. A blockchain node 102 can identify a block for truncation and then truncate the hash values stored therein, in accordance with the truncation utilized in generating the data reference values for that block. For instance, if the block includes 512-bit hash values, the first half of each of the 512-bit hash values may be retained and the remaining 256 bits truncated off. The result is that the size of the hash values stored in the block may be cut in half, where only 256-bit hash values remain. As the block header already includes a data reference value for the resulting 256-bit hash values, no new calculations or checks need to be performed, and the block header can remain in its original form without any changes or additions. This means that the rest of the block is still provable and can be maintained without any changes, which enables the reduction of the data size of the block without affecting the operation or immutability of the blockchain. When a blockchain node 102 needs to verify a truncated block, it can simply identify the size of the hash values stored therein, identify the Merkle root for the hash values, and then compare it to the appropriate data reference value stored in the block header. Thus, the blockchain can continue standard operation with a reduced file size. The truncation operation can be performed multiple times depending on the number of data reference values stored in the header for the particular block. For instance, in the above example, the original 512-bit hash values may be truncated down to the first 64 bits of each, reducing the size of the hash values in a block by 87.5%. This can be repeated for any blocks in the blockchain, resulting in a significant reduction in data size.

In some cases, truncation can be performed in a different manner for blocks. For instance, some blocks may truncate hash values by removing the latter half of a hash value, while others may truncate hash values by remoting the first half, and still others may truncate a hash value by removing bits starting at a specified position. In such cases, the block header for a block may include an indication of the truncation utilized when identifying the data reference values stored therein. For instance, the block header may include a three-bit value that indicates the first position from which truncation should occur.

In some embodiments, blockchain nodes 102 may perform a truncation operation based on predefined criteria. For instance, in one example, a block may have its hash values truncated after a predetermined period of time, such as based on the timestamp included in the block header. For example, blocks may have their hash values truncated once the block is one year old. In a second example, truncation may be performed once a predetermined number of new blocks have been added to the chain. For example, once a block is over 100 blocks old, the hash values in that block may be truncated. In a third example, truncation may occur when data size of the blockchain reaches a predetermined amount. For example, if the blockchain reaches one gigabyte, truncation on all blocks or a predetermined number of blocks (e.g., the oldest 50% of blocks) may occur. In some such instances, file size may be proportional to the number of blocks in the chain (e.g., greater than 100 megabytes for every 10,000 blocks). Other suitable criteria for determining when truncation occurs will be apparent to persons having skill in the relevant art. In some cases, all blockchain nodes 102 may perform the same truncation operations such that the copy of the blockchain stored in each blockchain node 102 is identical. In other cases, each blockchain node 102 may maintain its own copy of the blockchain that may be truncated based on the preferences and needs of the individual blockchain node 102. For example, a small business may desire a higher amount of truncation than a data farm.

In some instances, truncation of hash values may result in potential collisions among the hash values. For example, if SHA-512 or another collision-resistant hashing algorithm is used, the may be practically impossible for there to be a collision among hash values. However, the truncation of such resulting hash values down to the first 64 bits of each hash value may result in potential collisions. In such instances, truncation may be performed after a predetermined period of time or other circumstance to mitigate the effects of collisions. For example, if the blockchain is used to store data regarding the chain of custody of consumer goods, truncation may be performed after a period of time in which the goods may be assumed to be out of circulation or after a time where proof of the chain of custody of a good may not be required. Such circumstances and criteria for truncation may vary based on the uses of the blockchain, the blockchain network 104, the blockchain nodes 102, and other entities that may utilize the blockchain or data stored therein.

The methods and systems discussed herein provide for the reduction in the data size of a blockchain through the use of truncation of hash values stored therein. The storage of multiple data reference values in each block header enables hash values stored in a block to be truncated without effecting the immutability and operation of a blockchain, requiring no additional data to be generated or any data to be edited. The result is that file size of a block may be immediately reduced at any blockchain node 102 without adversely affecting the operation of the blockchain or any blockchain node 102 related thereto. In addition, the truncation may be performed by any blockchain node 102 independently, enabling blockchain nodes 102 to satisfy their own needs regarding data size and bandwidth without forcing truncation throughout the blockchain network 104. Thus, the methods and systems discussed herein provide for a significant improvement to the operation of blockchains and the storage thereof in blockchain networks 104.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 600 illustrated in FIG. 6 and discussed in more detail below may be a suitable, high level configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, computing devices 106, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that are superimposed or otherwise encoded with confirmed blockchain transactions, confirmed blocks, messages regarding confirmation of blocks, new blocks for confirmation, truncation information, data reference values, truncation criteria, etc. The receiving device 202 may also be configured to receive data signals electronically transmitted by computing devices 106, such as may be superimposed or otherwise encoded with blockchain transactions, which may already be hashed or may be hashed by the blockchain node 102 upon receipt. In some cases, the blockchain transaction may be immediately hashed and the original value discarded such that the blockchain node 102 is only in possession of hash values and does not possess any un-hashed transactional data.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, hashing module 218, etc. As used herein, the term "module" may be hardware particularly programmed or configured with software, firmware or specific hardware to receive an input, perform one or more processes using the input, and provides an output. The input, output, and processes performed by various modules will be apparent to one skilled in the art based upon the present disclosure.

The blockchain node 102 may also include a memory 208. The memory 208 may be configured to store data for use by the blockchain node 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, truncation rules and criteria, etc.

The blockchain node 102 may also include blockchain data 206, which may be stored in the memory 208 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 102, truncation rules and criteria, etc.

The blockchain node 102 may include a querying module 214. The querying module 214 may be configured to execute queries on databases to identify information. The querying module 214 may receive one or more data values or query strings and may execute a query string based thereon on an indicated database, such as the memory 208 of the blockchain node 102 to identify information stored therein. The querying module 214 may then output the identified information to an appropriate engine or module of the blockchain node 102 as necessary. The querying module 214 may, for example, execute a query on the memory 208 to identify truncation rules to for use in generating the block header for a new block. The querying module 214 may also be configured to execute a query on the blockchain data 206 to truncate hash values stored in blocks for reducing file size thereof, as discussed herein.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, new blocks, data reference values, block reference values, timestamps, etc.

The blockchain node 102 may also include a hashing module 218. The hashing module 218 may be configured to hash data for use in performing the functions of the blockchain node 102 as discussed herein. The hashing module 218 may receive instructions as input, may hash data as instructed, and may output the resulting hash value(s) to other modules or engines of the blockchain node 102. In some cases, the instructions may include the data to be hashed and/or the hashing algorithms to use in generating hash values. In other cases, the hashing module 218 may be configured to identify such data, such as by providing instructions to the querying module 214 or other components in the blockchain node 102. The hashing module 218 may be configured to, for example, generate hash values for blockchain transactions including truncated hash values, generate Merkle trees and identify roots thereof, etc.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, computing devices 106, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other blockchain nodes 102 that are superimposed or otherwise encoded with new blockchain data values, new blocks for confirmation, confirmed blocks, messages regarding block or transaction confirmations, truncation rules and criteria, instructions for truncation, and other data used in the operation and management of the blockchain. The transmitting device 220 may also be configured to electronically transmit data signals to computing devices 106 as part of the operation of the blockchain in the blockchain network 104, such as may be superimposed or otherwise encoded with notifications, blockchain data, etc.

Identification of Multiple Data Reference Values

FIG. 3 illustrates the generation of first, second, and third reference values for a new block in the blockchain network 104 in the system 100 as performed by a blockchain node 102 as discussed above.

In the example illustrated in FIG. 3, a blockchain node 102 may receive four new blockchain transactions for inclusion in the next block to be added to the blockchain. For each of the blockchain transactions, the blockchain node 102 may identify a first hash value 302, which may be a 512-bit hash value, such as generated via application of SHA-512 to the corresponding blockchain transaction. Using the first hash values 302, the blockchain node 102 may generate a first reference value 304, which may be a root of a Merkle tree that is generated using the four first hash values 302. In the illustrated example, the first reference value 304 and other reference values may be 512 bits. However, the size of the reference values may vary and may be unrelated to the size of the respective hash values.

The blockchain node 102 may also identify a truncated version of each of the first hash values 302 as second hash values 306. In the illustrated example, the second hash value 306 for each blockchain transaction may be the first 256 bits of each first hash value 302. Using the four second hash values 306, the blockchain node 102 may identify a second reference value 308, which may be the root of a Merkle tree generated using the four second hash values 306. While the second reference value 308 is illustrated as being 512 bits, the second reference value 308 may match the second hash values 306 in size or may vary from the size of the first reference value 304.

The blockchain node 102 may also identify a truncated version of the second hash values 306 as third hash values 310. In the illustrated example, the third hash values 310 for each blockchain transaction may be the first 128 bits of each first hash value 302 (e.g., which are also the first 128 bits of the second hash value 306). The blockchain node 102 may also generate a third reference value 312 for the third hash values 310, which may be the root of a Merkle tree that is generated using the four third hash values 310. As discussed above, the third reference value 312 may be 512 bits, may be the same 128-bit size as the third hash values 310, or may have an alternative size. As illustrated in FIG. 3, the third hash values 310 may be of a significantly smaller data size than the first hash values 302, illustrating the value in using truncation as discussed herein.

FIG. 4 illustrates a block 402 in the blockchain in the system 100 where truncation is performed, which illustrates the reduced data size.

The block 402 illustrated in FIG. 4 includes a block header that is comprised of a timestamp 404, a reference hash 406 (e.g., a block reference value that is a hash of the block header of the most recent block in the blockchain prior to block 402), a first reference value 408 (e.g., the first reference value 304 from FIG. 3), and a second reference value 410 (e.g., the second reference value 308 from FIG. 3). In addition to the block header, the block 402 may include four first hash values 412 (e.g., the first hash values 302 in FIG. 3). In the illustrated example, each of the four components of the block header are illustrated as being 512 bits. In implementation, the size of the components in the block header may vary from those illustrated and may also vary from one another. For instance, the timestamp 402 may be 64 bits, the block reference value 406 may be 256 bits, and each of the first and second reference values 408 and 410 may be 512 bits.

When a blockchain node 102 wants to truncate the block 402, they can truncate each of the first hash values 412 stored therein. The truncation may result in each of the first hash values 412 becoming the second hash values 414, as illustrated in FIG. 3, where the first 256 bits of each of the first hash values 412 are retained. The result is that the size of the hash values stored in the block 402 is cut in half, and the overall size of the block 402 is reduced to 75% of its original size. Such a reduction in file size can be even more significant in instances where a block 402 may include significantly more hash values. Furthermore, if a blockchain includes millions of blocks, reducing the file size of each block by even 25% may result in a significant overall reduction in file size, which can improve system operation of blockchain nodes 102, reduce bandwidth needed for transmissions of blockchain data, and other benefits.

Exemplary Method for Blockchain Data Size Reduction

Figure 5:
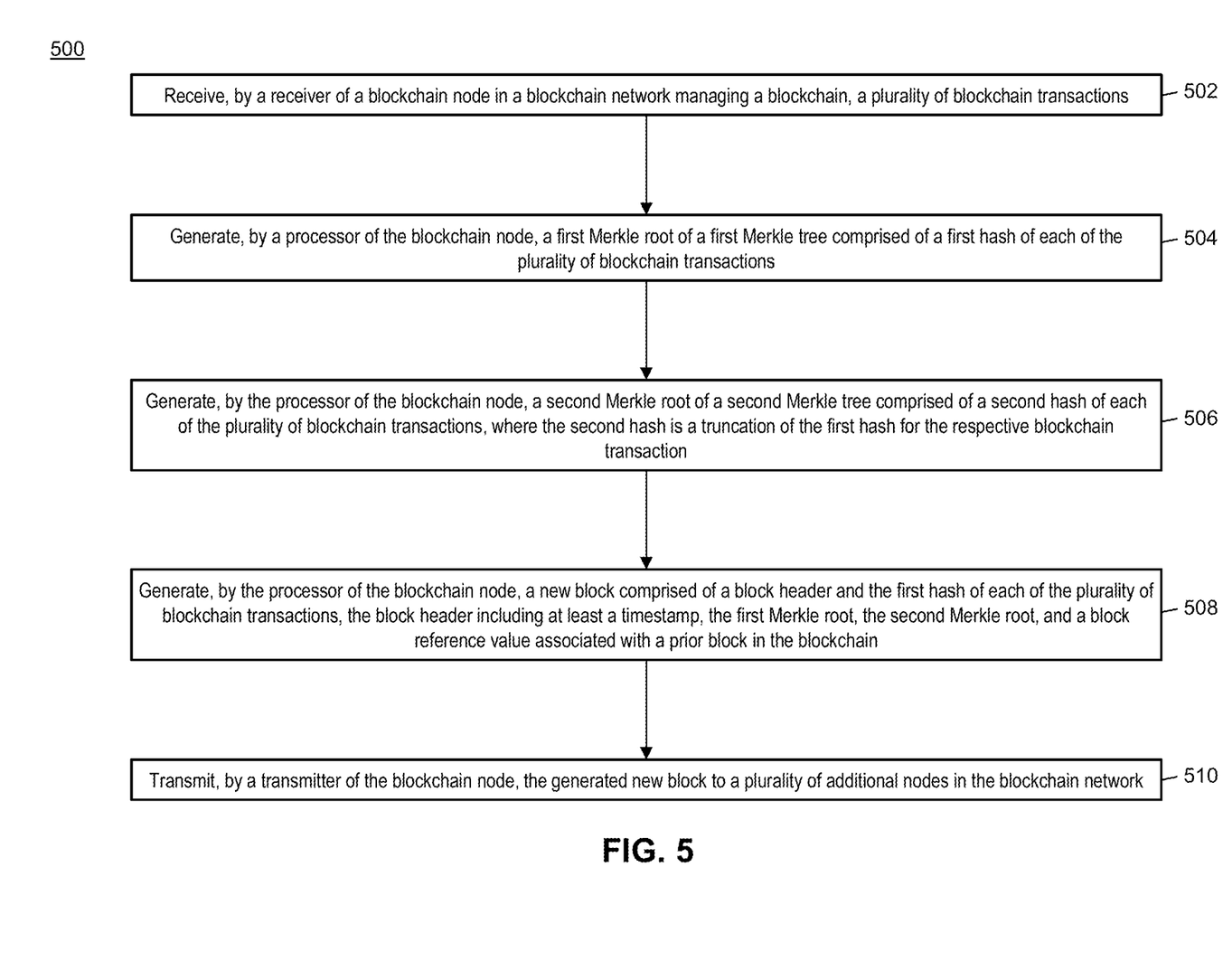
FIG. 5 is a flow chart illustrating an exemplary method for reducing file size of a blockchain through hash truncation in accordance with exemplary embodiments.

FIG. 5 illustrates a method 500 for reducing file size of a blockchain through hash truncation, where hash values stored in a blockchain are truncated, but the use of multiple reference values in a block header maintains immutability of the blockchain.

In step 502, a plurality of blockchain transactions are received by a receiver (e.g., the receiving device 202) of a blockchain node (e.g., blockchain node 102) in a blockchain network (e.g., the blockchain network 104) that manages a blockchain. In step 504, a first Merkle root of a first Merkle tree comprised of a first hash for each of the plurality of blockchain transactions may be generated by a processor (e.g., the hashing module 218) of the blockchain node.

In step 506, a second Merkle root of a second Merkle tree comprised of a second hash of each of the plurality of blockchain transactions may be generated by the processor of the blockchain node, where the second hash is a truncation of the first hash for the respective blockchain transaction. In step 508, a new block comprised of a block header and the first hash of each of the plurality of blockchain transactions may be generated by a processor (e.g., the generation module 216) of the blockchain node, the block header including at least a timestamp, the first Merkle root, the second Merkle root, and a block reference value associated with a prior block in the blockchain. In step 510, the generated new block may be transmitted by a transmitter (e.g., the transmitting device 220) of the blockchain node to a plurality of additional nodes in the blockchain network.

In one embodiment, the method 500 may further include storing, in a memory (e.g., memory 208) of the blockchain node, the blockchain, where the blockchain is comprised of a plurality of blocks including the prior block and the new block. In a further embodiment, the block reference value may be generated by applying a hashing algorithm to a header of the prior block as part of generating the new block. In another further embodiment, the method 500 may also include truncating, by the processor (e.g., querying module 214) of the blockchain node, the first hash of each of the plurality of blockchain transactions stored in the new block stored in the memory of the blockchain node. In an even further embodiment, the truncation may be performed after a predetermined period of time since the timestamp. In another even further embodiment, the truncation may be performed after the addition of a predetermined number of subsequent blocks to the blockchain. In yet another even further embodiment, the truncation may be performed after the blockchain exceeds a predetermined data size in the memory of the blockchain node. In some embodiments, the received plurality of blockchain transactions may be the first hash of each of the plurality of blockchain transactions.

Computer System Architecture

FIG. 6 illustrates a computer system 600 in which embodiments of the present disclosure, or portions thereof, may be implemented as computer-readable code. For example, the blockchain node 102 of FIGS. 1 and 2 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIG. 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for reducing file size of a blockchain through hash truncation. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for reducing file size of a blockchain through hash truncation, comprising:
    receiving a plurality of blockchain transactions;
    generating a first Merkle root of a first Merkle tree comprised of a first hash of each of the plurality of blockchain transactions;
    generating a second Merkle root of a second Merkle tree comprised of a second hash of each of the plurality of blockchain transactions, where the second hash is a truncation of the first hash for the respective blockchain transaction;
    generating a new block comprised of a block header and the first hash of each of the plurality of blockchain transactions, the block header including at least a timestamp, the first Merkle root, the second Merkle root, and a block reference value; and
    transmitting the generated new block to a plurality of nodes in the blockchain network.

2. The method of claim 1, further comprising:
    storing the blockchain, where the blockchain is comprised of a plurality of blocks including the prior block and the new block.

3. The method of claim 2, wherein the first block reference value is generated by applying a hashing algorithm to a header of the prior block as part of generating the new block.

4. The method of claim 2, further comprising:
    truncating the first hash to the second hash of each of the plurality of blockchain transactions stored in the new block stored in the memory of the blockchain node.

5. The method of claim 4, wherein the truncation is performed after a predetermined period of time since the timestamp.

6. The method of claim 4, wherein the truncation is performed after the addition of a predetermined number of subsequent blocks to the blockchain.

7. The method of claim 4, wherein the truncation is performed after the blockchain exceeds a predetermined data size in the memory of the blockchain node.

8. The method of claim 1, wherein the received plurality of blockchain transactions is the first hash of each of the plurality of blockchain transactions.

9. The method of claim 4, further comprising:
    generating third Merkle root of a third Merkle tree comprised of a third hash of each of the plurality of blockchain transactions, wherein the third hash is a larger truncation of the first hash than the second hash for the respective blockchain transaction;
    wherein the block header includes the third first Merkle root; and
    truncating the first hash to the third hash of each of the plurality of blockchain transactions stored in the new block stored in the memory of the blockchain node.

10. The method of claim 9, further comprising:
    generating, for each of the first hash, the second hash, and the third hash, a data reference value, wherein each data reference value is equal to a size of the hash; and
    wherein the block header includes each of the data reference values.

11. A system for reducing file size of a blockchain through hash truncation, comprising:
    a blockchain node in a blockchain network, the blockchain node including
        a receiver receiving a plurality of blockchain transactions,
        a processor
            generating a first Merkle root of a first Merkle tree comprised of a first hash of each of the plurality of blockchain transactions,
            generating a second Merkle root of a second Merkle tree comprised of a second hash of each of the plurality of blockchain transactions, where the second hash is a truncation of the first hash for the respective blockchain transaction, and
            generating a new block comprised of a block header and the first hash of each of the plurality of blockchain transactions, the block header including at least a timestamp, the first Merkle root, the second Merkle root, and a block reference value, and
        a transmitter transmitting the generated new block to a plurality of additional nodes in the blockchain network.

12. The system of claim 11, wherein the blockchain node further includes a memory storing the blockchain, where the blockchain is comprised of a plurality of blocks including the prior block and the new block.

13. The system of claim 12, wherein the block reference value is generated by applying a hashing algorithm to a header of the prior block as part of generating the new block.

14. The system of claim 12, wherein the processor of the blockchain node truncates the first hash of each of the plurality of blockchain transactions stored in the new block stored in the memory of the blockchain node.

15. The system of claim 14, wherein the truncation is performed after a predetermined period of time since the timestamp.

16. The system of claim 14, wherein the truncation is performed after the addition of a predetermined number of subsequent blocks to the blockchain.

17. The system of claim 14, wherein the truncation is performed after the blockchain exceeds a predetermined data size in the memory of the blockchain node.

18. The system of claim 11, wherein the received plurality of blockchain transactions is the first hash of each of the plurality of blockchain transactions.

19. The system of claim 14, further comprising:
the processor of the blockchain node generates third Merkle root of a third Merkle tree comprised of a third hash of each of the plurality of blockchain transactions, wherein the third hash is a larger truncation of the first hash than the second hash for the respective blockchain transaction;
wherein the block header includes the third first Merkle root; and
the processor of the blockchain node truncates the first hash to the third hash of each of the plurality of blockchain transactions stored in the new block stored in the memory of the blockchain node.

20. The system of claim 11, further comprising:
the processor of the blockchain node generates, for each of the first hash, the second hash, and the third hash, a data reference value, wherein each data reference value is equal to a size of the hash; and
wherein the block header includes each of the data reference values.

* * * * *